US012675984B2

(12) United States Patent
Hazeyama

(10) Patent No.: US 12,675,984 B2
(45) Date of Patent: Jul. 7, 2026

(54) SUPPORT DEVICE AND METHOD

(71) Applicant: OMRON Corporation, Kyoto (JP)

(72) Inventor: Hiroyuki Hazeyama, Kyoto (JP)

(73) Assignee: OMRON Corporation, Kyoto (JP)

( * ) Notice: Subject to any disclaimer, the term of this patent is extended or adjusted under 35 U.S.C. 154(b) by 384 days.

(21) Appl. No.: 18/547,573

(22) PCT Filed: Jan. 17, 2022

(86) PCT No.: PCT/JP2022/001374
§ 371 (c)(1),
(2) Date: Aug. 23, 2023

(87) PCT Pub. No.: WO2022/190636
PCT Pub. Date: Sep. 15, 2022

(65) Prior Publication Data
US 2024/0144661 A1 May 2, 2024

(30) Foreign Application Priority Data
Mar. 12, 2021 (JP) ................................. 2021-040335

(51) Int. Cl.
G06V 10/40 (2022.01)
G06T 7/00 (2017.01)
(Continued)

(52) U.S. Cl.
CPC .......... G06V 10/776 (2022.01); G06T 7/0004 (2013.01); G06V 10/40 (2022.01);
(Continued)

(58) Field of Classification Search
CPC .... G06V 10/776; G06V 10/40; G06V 10/764; G06V 10/774; G06T 7/0004;
(Continued)

(56) References Cited

U.S. PATENT DOCUMENTS 6,256,093 B1* 7/2001 Ravid ................ G01N 21/9501
356/237.4
6,922,482 B1* 7/2005 Ben-Porath ............. G06T 7/001
382/149
(Continued)

FOREIGN PATENT DOCUMENTS

CN        107341499 A      11/2017
CN        109978816 A       7/2019
(Continued)

OTHER PUBLICATIONS

Extended European Search Report issued in European Patent Application No. 22766604.7 dated Dec. 12, 2024.
(Continued)

*Primary Examiner* — Sheela C Chawan
(74) *Attorney, Agent, or Firm* — ROSSI, KIMMS & McDOWELL LLP

(57) ABSTRACT

A technique is provided that uses AI processing to enable stable discrimination of various defect types for a defect occurring in a sheet product. Provided is an assistance device that assists a determination inspection for determining a type of an abnormality. The assistance device includes a classification processing unit and a learning discrimination unit. The learning discrimination unit discriminates an abnormality type for each of the one or more classes to be processed selected by the classification processing unit, based on an individual discrimination result from the learning discriminator trained with the discrimination criterion for each abnormality type.

5 Claims, 8 Drawing Sheets

(51) Int. Cl.
  *G06V 10/764* (2022.01)
  *G06V 10/776* (2022.01)
(52) U.S. Cl.
  CPC .. *G06V 10/764* (2022.01); *G06T 2207/20081*
    (2013.01); *G06T 2207/30108* (2013.01)
(58) Field of Classification Search
  CPC . G06T 2207/20081; G06T 2207/30108; G06T
    2207/30164; G06F 18/2433; G06F
    18/2431; G01N 21/892
  USPC .................................................. 382/100, 141
  See application file for complete search history.

(56) References Cited

U.S. PATENT DOCUMENTS

| | | | | |
|---|---|---|---|---|
| 2012/0027285 | A1* | 2/2012 | Shlain ................. | G06F 18/2431 |
| | | | | 382/149 |
| 2013/0202189 | A1* | 8/2013 | Shibuya ............. | G06V 10/7788 |
| | | | | 382/149 |
| 2019/0188845 | A1 | 6/2019 | Tamai | |
| 2019/0383730 | A1 | 12/2019 | Chang Chien | |
| 2021/0004721 | A1 | 1/2021 | Ijiri | |

FOREIGN PATENT DOCUMENTS

| | | | |
|---|---|---|---|
| CN | 110135477 | A | 8/2019 |
| JP | 2010008174 | A | 1/2010 |
| JP | 2012026982 | A | 2/2012 |
| JP | 2015038441 | A | 2/2015 |
| JP | 2019159959 | A | 9/2019 |
| JP | 2021033564 | A | 3/2021 |
| TW | M567355 | U | 9/2018 |
| TW | I663960 | B | 7/2019 |
| WO | 2009054102 | A1 | 4/2009 |

OTHER PUBLICATIONS

Office Action issued in Chinese Appln. No. 202280014207.7 mailed Oct. 25, 2025. English machine translation provided.
International Search Report issued in Intl. Appln. No. PCT/JP2022/001374, mailed Mar. 29, 2022. English translation provided.
Written Opinion issued in Intl. Appln. No. PCT/JP2022/001374, mailed Mar. 29, 2022. English translation provided.
Office Action issued in Chinese Appln. No. 202280014207.7 mailed Mar. 13, 2026.
Ng et al. "A One-Versus-All Class Binarization Strategy for Bearing Diagnostics of Concurrent Defects." Sensors, pp. 1295-1321, Jan. 13, 2014.
Faula et al. "Détection et classification One-Class de défauts sur des surfaces bétonnées." Sciencesconf.org, pp. 1-9, Aug. 24, 2020. English abstract provided.

* cited by examiner

FIG. 6A

| INSECT CASE AI | FOREIGN MATTER CASE AI | CLASSIFICATION DESTINATION |
|---|---|---|
| DISCRIMINATION OF INSECT | DISCRIMINATION OF FOREIGN MATTER | TO BE INSPECTED |
| DISCRIMINATION OF INSECT | DISCRIMINATION OF DEFECT TYPE OTHER THAN FOREIGN MATTER | INSECT |
| DISCRIMINATION OF DEFECT TYPE OTHER THAN INSECT | DISCRIMINATION OF FOREIGN MATTER | FOREIGN MATTER |
| DISCRIMINATION OF DEFECT TYPE OTHER THAN INSECT | DISCRIMINATION OF DEFECT TYPE OTHER THAN FOREIGN MATTER | NOT CLASSIFIED |

FIG. 6B

| WRINKLE DISCRIMINATION AI | CLASSIFICATION DESTINATION |
|---|---|
| DISCRIMINATION OF WRINKLE | WRINKLE |
| DISCRIMINATION OF DEFECT TYPE OTHER THAN WRINKLE | NOT CLASSIFIED |

SUPPORT DEVICE AND METHOD

TECHNICAL FIELD

The present invention relates to a technique for detecting an abnormal portion of a sheet-like object to be inspected.

BACKGROUND ART

In a production line for manufacturing or processing sheet-like articles (hereinafter, also referred to as "sheet products" or simply "sheets"), an inspection device is used which detects an abnormal portion (foreign matter contamination, stain, wrinkle, or the like) on a sheet by using an image obtained by irradiating the sheet with visible light or ultraviolet light and imaging transmitted light or reflected light with a camera (for example, see Patent Literature 1).

Known inspection devices can detect an abnormal portion on a sheet but fail to precisely discriminate what type of abnormality has been detected. Accordingly, in the related art, a sheet with an abnormal portion detected thereon ends up having to be discarded, determined to be a low rank product, or subjected to a detailed visual inspection. However, in practice, various abnormalities may occur on a sheet (hereinafter, abnormalities that occur on the sheet are also referred to as "defects") and some abnormalities need not be determined to make the product defective depending on the type, use, material, and the like of the product.

With the recent progress of information processing technique, attempts have been made to use AI (for example, machine learning, deep learning, or the like) to classify what type of defect has been detected (multi-class classification) on a sheet, and to replace visual inspection affecting shipment decisions for sheet products performed manually in the related art. In AI that performs the multi-class classification (hereinafter also referred to as "multi-class classification AI"), for example, a number of defect types such as air bubble, hole, insect, foreign matter, wrinkle, and fiber are identified for an image of a defect portion, based on defect images and correct-answer defect types learned in advance. However, in the identification of the defect type performed by the multi-class classification AI, set data of "defect image+correct-answer defect type" is required for every defect type for training the AI, and thus a defect type which is not frequently detected may fail to be identified. Accordingly, for example, an image of an insect or the like having a feature different from that of a learned image of an insect may be identified as foreign matter or a hole. Furthermore, in a process of performing the multi-class classification, tuning for optimizing a network structure and parameters in the algorithm is required as a technical problem. In another aspect of the identification of defect type performed by the multi-class classification AI, relearning with new learning data leads to unstable result output. Thus, at present, visual inspection is still performed for final shipment decisions.

PRIOR ART DOCUMENT

Patent Document

Patent Literature 1: JP 2010-8174 A (JP 4950951 B)

SUMMARY OF THE INVENTION

Problems to be Solved by the Invention

The present invention has been made in view of the above-described circumstances, and an object of the present invention is to provide a technique using AI processing to enable stable discrimination of various defect types for a defect occurring in a sheet product.

Means for Solving the Problem

An aspect of a disclosed technique for solving the above-described problem is an assistance device for assisting a determination inspection for detecting, from a captured image of an object to be inspected, an abnormality occurring in the object to be inspected and determining a type of the abnormality detected, the assistance device including:

a classification processing unit; and a learning discrimination unit, the classification processing unit being configured to calculate, from the captured image, a feature amount of the abnormality occurring in the object to be inspected, to classify the feature amount calculated into a plurality of classes, and to select, from the plurality of classes, one or more classes to be processed, for each which abnormality types are to be discriminated using the learning discrimination unit; and the learning discrimination unit including a learning discriminator for each abnormality type, the learning discriminator being trained with a discrimination criterion by using set data obtained by combining an element image causing the abnormality and an abnormality type corresponding to the element image being a correct answer, the discrimination criterion being for discriminating whether an abnormality to be discriminated is of the abnormality type being a correct answer or of an abnormality type other than the abnormality type being a correct answer, wherein the learning discrimination unit discriminates an abnormality type for each of the one or more classes to be processed selected by the classification processing unit, based on an individual discrimination result from the learning discriminator trained with the discrimination criterion for each abnormality type.

Thus, as preprocessing before discrimination of defect type by the single-class AI processing, an inspection assistance device 10 corresponding to the assistance device can select one or more feature amount patterns to which the single-class AI processing is applied. This can reduce in advance feature amounts related to the discrimination of defect type of an abnormal portion detected in the sheet product, allowing for a relative reduction in processing workload related to the discrimination using the single-class AI processing. A single-class AI processing unit 30 corresponding to the learning discrimination unit can include a plurality of single-class AI processors (30a to 30n) each corresponding to the learning discriminator. For each single-class AI processor, a dataset ("defect image+correct-answer defect type") for identifying a single defect type is prepared as learning data, and unlike an AI processor performing multi-class classification, the single-class AI processor need not store, in a database, a large amount of set data of "defect image+correct-answer defect type" for all defect types. For example, the single-class AI processing only needs to discriminate between a single defect type and the other defect types, and thus does not require a complicated network structure to be constructed as in the multi-class AI processing nor advanced tuning of parameters. Accordingly, a worker is not required to have a high level of skill. Furthermore, since a single defect type only needs to be discriminated, learning of new set data does not affect discrimination of another defect type, and stable discrimination results can be obtained even after relearning. The inspection assistance device 10 can provide a technique using AI processing to enable stable discrimination of various defect types for a defect occurring in a sheet product.

In an aspect of the disclosed technique, the learning discrimination unit may include a first learning discriminator trained with a discrimination criterion for discriminating a first abnormality and a second learning discriminator trained with a discrimination criterion for discriminating a second abnormality. When, for one class of the plurality of classes to be processed, a discrimination result from the first learning discriminator identifies the first abnormality and a discrimination result from the second learning discriminator identifies an abnormality type other than the second abnormality, the abnormality type for the one class may be determined to be the first abnormality. The discrimination results from the single-class AI processors are combined to enable enhancement of the discrimination accuracy for the defect type learned by each single-class AI.

In an aspect of the disclosed technique, when, for one class of the plurality of classes to be processed, a discrimination result from the first learning discriminator identifies an abnormality type other than the first abnormality and a discrimination result from the second learning discriminator identifies the second abnormality, the abnormality type for the one class may be determined to be the second abnormality. Also in such an aspect, the discrimination results from the single-class AI processors are combined to enable enhancement of the discrimination accuracy for the defect type learned by each single-class AI.

In an aspect of the disclosed technique, when, for one class of the plurality of classes to be processed, a discrimination result from the first learning discriminator identifies the first abnormality and a discrimination result from the second learning discriminator identifies the second abnormality, or a discrimination result from the first learning discriminator identifies an abnormality type other than the first abnormality and a discrimination result from the second learning discriminator identifies an abnormality type other than the second abnormality, discrimination of an abnormality type for the one class may be handed over to specified processing. Thus, the discrimination results from the single-class AI processors are combined to enable the feature amount of the defect portion to be excluded from the targets for discrimination of defect type. The discrimination results from the single-class AI processing can be combined and arbitrated, allowing a reduction in processing workload related to the discrimination of defect type. This enables on-line processing time to be shortened. The discrimination results from the single-class AI processors are combined to enable enhancement of the discrimination accuracy for the defect type learned by each single-class AI.

In an aspect of the disclosed technique, the classification processing unit may further classify into a plurality of subclasses a feature amount of a class, for which the abnormality type has been determined. Accordingly, since the feature amount of the defect type discriminated using the single-class AI processing can be further classified into subclasses, ranking is enabled that identifies the product type of the sheet product for which the defect type is discriminated by the single-class AI processing.

Another aspect of the disclosed technique is a method performed by a computer of an assistance device that assists a determination inspection for detecting, from a captured image of an object to be inspected, an abnormality occurring in the object to be inspected and determining a type of the abnormality detected, the method including:

calculating, from the captured image, a feature amount of the abnormality occurring in the object to be inspected, classifying the feature amount calculated into a plurality of classes, and selecting a predetermined class from among the plurality of classes;

learning, for each type of the abnormality, a discrimination criterion by using set data obtained by combining an element image causing the abnormality and an abnormality type corresponding to the element image being a correct answer, the discrimination criterion being for discriminating whether an abnormality to be discriminated is of the abnormality type being a correct answer or of an abnormality type other than the abnormality type being a correct answer; and discriminating an abnormality type for the predetermined class, based on an individual discrimination result obtained by discrimination using the discrimination criterion learned for each type of the abnormality.

Also in such an aspect, for the inspection assistance device 10 corresponding to the assistance device, the single-class AI processing unit 30 corresponding to the learning discrimination unit can include a plurality of single-class AI processors (30a to 30n) each corresponding to the learning discriminator. For each single-class AI processor, a dataset ("defect image+correct-answer defect type") for identifying a single defect type is prepared as learning data, and unlike an AI processor performing multi-class classification, the single-class AI processor need not accumulate, in the database, a large amount of set data of "defect image+correct-answer defect type" for all defect types. For example, the single-class AI processing only needs to discriminate between a single defect type and the other defect types, and thus does not require a complicated network structure to be constructed as in the multi-class AI processing nor advanced tuning of parameters. Accordingly, the worker is not required to have a high level of skill. Furthermore, since a single defect type only needs to be discriminated, learning of new set data does not affect discrimination of another defect type, and stable discrimination results can be obtained even after relearning. The inspection assistance device 10 can provide a technique using AI processing to enable stable discrimination of various defect types for a defect occurring in a sheet product.

Effect of the Invention

According to the present invention, a technique can be provided that uses AI processing to enable stable discrimination of various defect types for a defect occurring in a sheet product.

BRIEF DESCRIPTION OF THE DRAWINGS

FIG. 6A and FIG. 6B are diagram illustrating arbitrations of discrimination results in the first embodiment of the present invention.

MODE FOR CARRYING OUT THE INVENTION

Application Example

Hereinafter, an application example of the present invention will be described with reference to the drawings.

Figure 1:
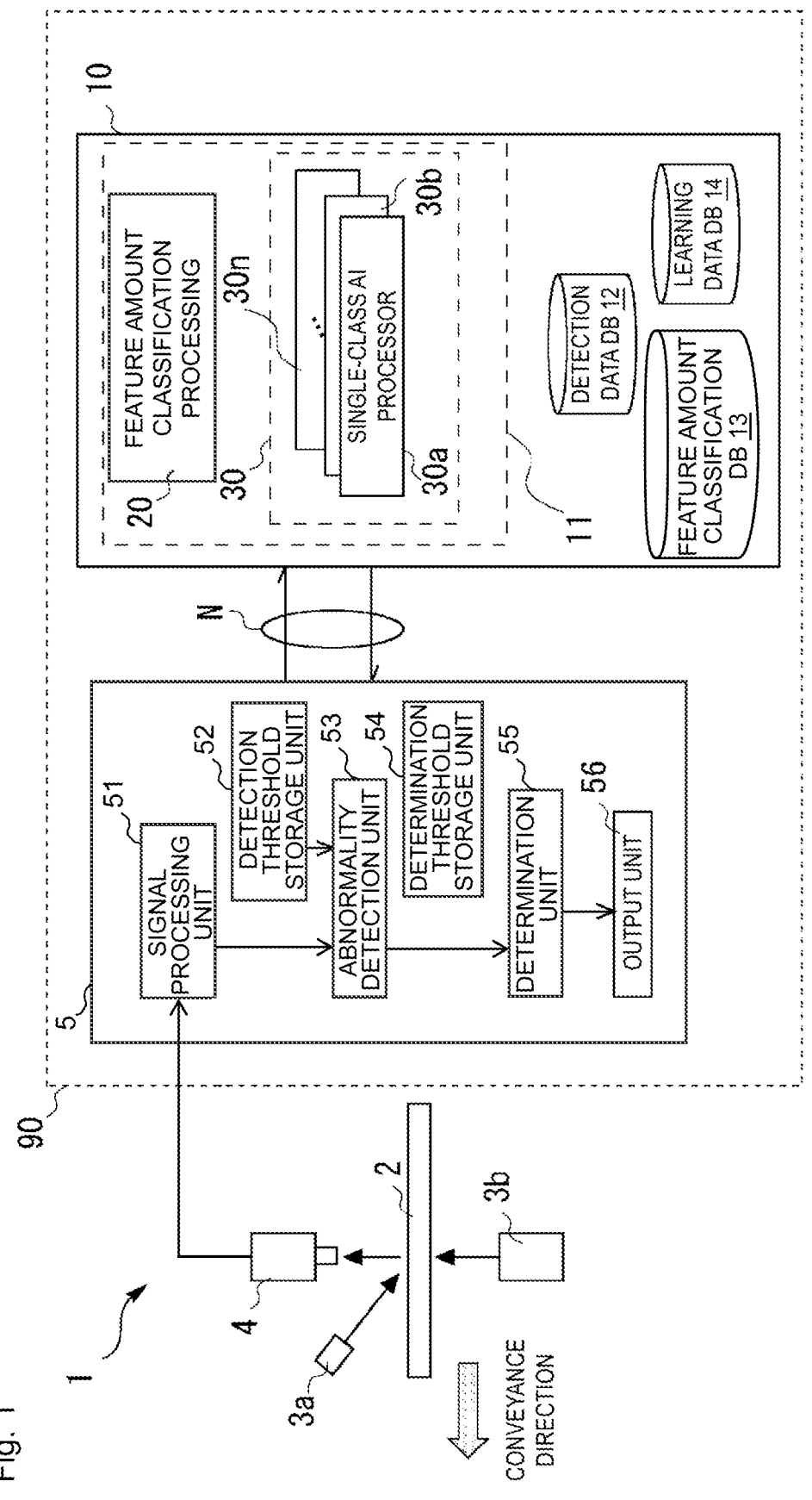
FIG. 1 is a block diagram illustrating a schematic configuration of an inspection assistance system according to a first embodiment of the present invention.

FIG. 1 is a block diagram illustrating a schematic configuration of an inspection assistance system 1 according to an application example of the present invention. The inspection assistance system 1 according to the present application example is a system that assists discrimination of what type of abnormality is occurring in an abnormal portion detected from a captured image of a sheet-like article (hereinafter, also referred to as a "sheet product" or simply a "sheet"). The inspection assistance system 1 uses single-class AI processors (30*a* to 30*n*) to individually discriminate the type of cause (for example, foreign matter contamination, stains, wrinkles, and the like) of the abnormality (hereinafter also referred to as a "defect") that can occur in a sheet product.

The inspection assistance system 1 according to the application example of the present invention includes an inspection assistance device 10 connected to a processing device 5 via a communication network N. The inspection assistance device 10 is a computer that assists a function of the processing device 5 connected to the communication network N, the function discriminating the type of an abnormality (hereinafter, an abnormality detected from a sheet is also referred to as a "defect"). The inspection assistance device includes a feature amount classification processing unit 20 and a single-class AI processing unit 30 in a control unit 11. The inspection assistance device 10 includes a detection data DB (database) 12, a feature amount classification DB 13, and a learning data DB 14. In the detection data DB 12, a captured image determined to have an abnormality detected therein is stored for offline processing, the captured image being transmitted from the processing device 5 via the communication network N. The feature amount classification DB stores a classification criterion related to classification of feature amounts. The learning data DB 14 stores set data including a set of "defect image+correct-answer defect type" for training each single-class AI processor.

In the inspection assistance device 10 according to the application example of the present invention, the feature amount classification processing unit 20 classifies the feature amount of a detected defect portion into a plurality of classes, based on the classification criterion stored in the feature amount classification DB 13. The single-class AI processing unit 30 includes a plurality of single-class AI processors (30*a* to 30*n*) each for identifying a single defect type for a corresponding class to which the feature amount classified by the feature amount classification processing unit 20 belongs. For some of the classes to which the feature amount classified by the feature amount classification processing unit 20 belongs, the single-class AI processing unit uses the single-class AI processing units (30*a* to 30*n*) to identify the defect type classified into the classes.

Figure 3:
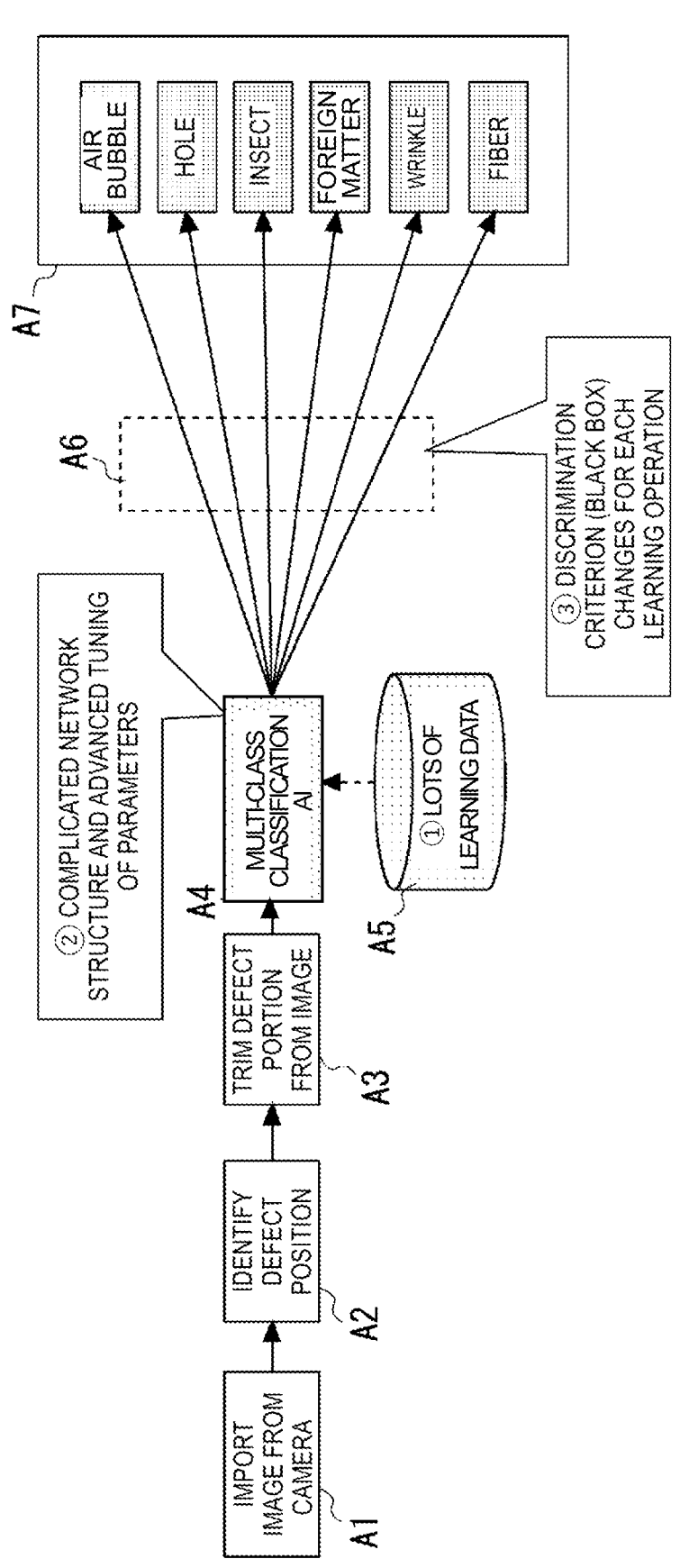
FIG. 3 is a diagram illustrating defect type discrimination processing using AI for performing multi-class classification according to a comparative example.
Figure 4:
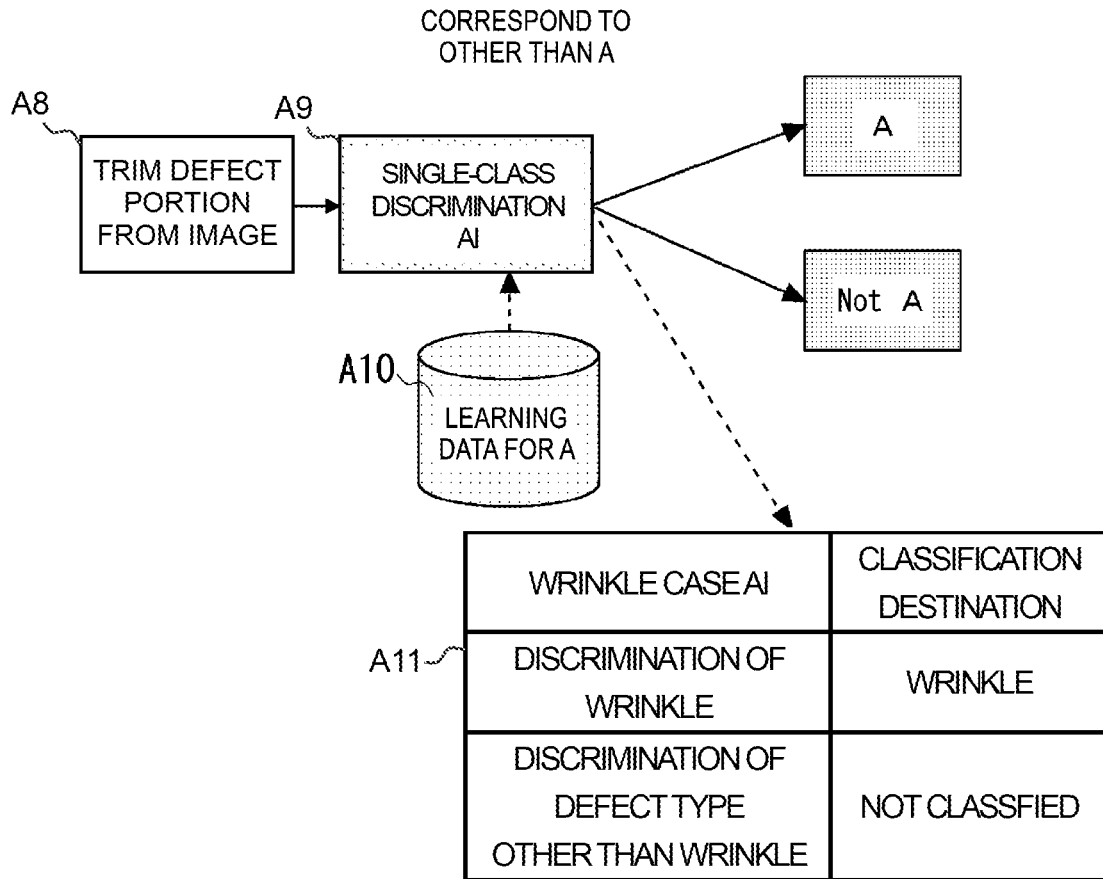
FIG. 4 is a diagram illustrating discrimination processing of a single-class AI processor according to the first embodiment of the present invention.

As illustrated in FIG. 4, in the discrimination using each single-class AI processor according to the present application example, a defect type included in an image to be classified is discriminated between a defect type learned using the set data and a not-classified type when a defect type other than the defect type learned using the set data is discriminated. Here, in the multi-class classification AI, as illustrated in FIG. 3, a defect type included in an image to be classified is classified for each of a plurality of defect types learned using the set data. Accordingly, as illustrated in circle 1 in FIG. 3, set data of "defect image+correct-answer defect type" needs to be prepared for every defect type for training AI, and thus a large amount of learning data for classification into six defect types is accumulated in the database. As illustrated in circle 2, a complicated network structure needs to be constructed that includes extraction of a feature amount for classification into six defect types from a trimmed image of a defect portion and modeling of type discrimination, and advanced tuning of parameters is required such as weighting among nodes connected together in a network. In a case where no engineer having such a skill is secured, application of the multi-class classification AI may be difficult. Furthermore, every time learning is performed, the criteria for the extraction of the feature amount, modeling, and the like for reaching the defect type change. For example, when a new "defect image+correct-answer defect type" for a defect type "wrinkle" is learned, a criterion for determining another defect type is affected. Accordingly, a defect image having stably been identified as a "wrinkle" before the learning may be more frequently determined to be a "fiber" or "foreign matter", leading to unstable determination.

For the single-class AI processor according to the present application example, a dataset ("defect image+correct-answer defect type") for discriminating a single defect type is prepared as learning data, and unlike the AI processor performing multi-class classification, the single-class AI processor need not accumulate, in the database, a large amount of set data of "defect image+correct-answer defect type" for all defect types. For example, the single-class AI processing only needs to discriminate between a single defect type and the other defect types, and thus does not require a complicated network structure to be constructed as in the multi-class AI processing nor advanced tuning of parameters. Accordingly, the worker is not required to have a high level of skill. Furthermore, since a single defect type only needs to be discriminated, learning of new set data does not affect discrimination of another defect type, and stable discrimination results can be obtained even after relearning. The inspection assistance device 10 according to the present application example can provide a technique using AI processing to enable stable discrimination of various defect types for a defect occurring in the sheet product.

First Embodiment

Hereinafter, specific embodiments of the present invention will be described in more detail with reference to the drawings.

[System Configuration]

FIG. 1 is a block diagram illustrating a schematic configuration of the inspection assistance system 1 according to an embodiment of the present invention. The inspection assistance system 1 according to the present embodiment is a system that assists discrimination of what type of abnormality is occurring in an abnormal portion detected in a captured image of a sheet-like article (hereinafter, also referred to as a "sheet product" or simply a "sheet"). The inspection assistance system 1 uses single-class AI processors (30a to 30n) to individually discriminate the type of cause (for example, foreign matter contamination, stains, wrinkles, and the like) of the abnormality (hereinafter also referred to as a "defect") that can occur in a sheet product. The inspection assistance system 1 according to the present embodiment includes the inspection assistance device 10 interconnected, via the communication network N, with the processing device 5 constituting a sheet inspection device. The communication network N is a wired or wireless network. The communication network N can employ an appropriate configuration in accordance with a connection scheme for equipment connected to the network. The communication network N can connect to a plurality of the sheet inspection devices and a plurality of the inspection assistance devices 10.

As illustrated in FIG. 1, the sheet inspection device includes, as an illumination system, a visible light source 3a that irradiates an upper surface (first surface) of an object to be inspected 2 with visible light and a visible light source for transmitted light 3b that irradiates a lower surface (second surface) of the object to be inspected 2 with visible light. The sheet inspection device includes an imaging device 4 as a measurement system. The visible light source 3a and the visible light source for transmission 3b are arranged to irradiate the same position on the object to be inspected 2 with light (however, different surfaces are irradiated with light). The imaging device 4 is arranged at a position where the imaging device 4 can image the object to be inspected 2 by using the light radiated from the visible light source 3a and reflected on the upper surface of the object to be inspected 2 and the light radiated from the visible light source for transmission 3b and transmitted straight through the object to be inspected 2. The illumination system and the measurement system may include a plurality of the imaging devices 4 in the width direction of the object to be inspected 2 aligned with the width of the object to be inspected 2 to allow the imaging devices 4 to image the object to be inspected 2 over the entire width thereof. The sheet inspection device includes the processing device 5 for detecting an abnormal portion included in the object to be inspected 2 and discriminating the type of the abnormality, based on an output signal from the imaging device 4. The sheet inspection device includes a function of detecting an abnormal portion included in the object to be inspected 2 based on an image obtained by the imaging device 4, discriminating the type of the detected abnormality, and outputting the result.

The object to be inspected 2 is formed in a sheet shape, for example, and is conveyed in the arrow direction of FIG. 1. Examples of the object to be inspected 2 include paper, a film, a resin, and cellulose. The object to be inspected 2 may be a separator used for a secondary battery, an optical sheet used for a liquid crystal, or the like. Note that, in the aspect illustrated in FIG. 1, the illumination system and the measurement system are fixed and the object to be inspected 2 is moved, but instead, the object to be inspected 2 may be fixed and the illumination system and the measurement system may be moved. The illumination system may be LEDs having limited wavelength regions or may have wavelength regions limited using a wavelength filter. The measurement system may be, for example, an imaging device (camera) including a CCD image sensor including light receiving elements arranged in series. Each light receiving element converts light into electric charge according to the amount of received light. The electric charge output from each light receiving element is input to the processing device 5 as an output signal (imaging data).

The processing device 5 includes, as functional elements, a signal processing unit 51, a detection threshold storage unit 52, an abnormality detection unit 53, a determination threshold storage unit 54, a determination unit 55, and an output unit 56. The signal processing unit 51 performs white shading processing on the signal of the imaging data output from the imaging device 4 to correct, for example, variation in the output levels of respective light receiving elements constituting the imaging device 4. For example, processing is performed in which pixels for one line such as 4096 pixels are each multiplied by a specified correction coefficient for every position of the pixels to level off the variation in the output levels caused by aberration of an optical lens or the like. The signal processing unit 51 may derive the luminance value of the captured image using a luminance ratio that is a value obtained by dividing an output luminance value resulting from the white shading by an output luminance value (normal value) obtained in a state where the object to be inspected 2 has no abnormality.

The abnormality detection unit 53 detects an abnormal portion included in the object to be inspected 2 by using a threshold for detecting an abnormal portion, the threshold being stored in the detection threshold storage unit 52. For example, the detection threshold storage unit 52 stores a threshold indicating a degree of change in the pixel value which is to be determined to be an abnormality. In a case where the degree of change in the pixel value of the image output from the imaging device 4 exceeds the threshold, an abnormality is determined to be present by the abnormality detection unit 53. Note that the threshold stored in the detection threshold storage unit is set by a user or the like in accordance with an inspection criterion or the like corresponding to the type, usage, material, or the like of the object to be inspected 2. When an abnormal portion is detected, the determination unit 55 discriminates the type of the abnormality, based on a plurality of the thresholds stored in the determination threshold storage unit 54 and used in the processing for discriminating the type of the abnormality. The output unit 58 is a function of outputting information regarding an abnormal portion. Although the output destination of the information is typically a display device such as an LCD, the information can be output to a printer or output with a message or an alarm issued from a speaker, or the information can be output to an external information processing device. In the present embodiment, the output unit 58 transmits the information regarding the abnormal portion to the inspection assistance device 10 via the communication network N connected to the processing device 5.

The inspection assistance device 10 according to the present embodiment is a computer that supports the function of discriminating the type of an abnormality (hereinafter, an abnormality detected from a sheet is also referred to as a "defect") of the processing device 5 connected to the communication network N. The inspection assistance device 10 includes a feature amount classification processing unit 20 and a single-class AI processing unit 30 in a control unit 11. The inspection assistance device 10 includes a detection data DB (database) 12, a feature amount classification DB 13, and a learning data DB 14. In the detection data DB 12, a captured image determined to contain abnormality detection is stored for offline processing, the captured image transmitted from the processing device 5 via the communication network N. The feature amount classification DB stores a classification criterion related to classification of feature amounts. The learning data DB 14 stores set data including a set of "defect image+correct-answer defect type" for training each single-class AI processor. Note that, as indicated by a thin dashed rectangular frame 90, the configuration of the processing device 5 may include the function of the inspection assistance device.

As will be described in detail below, the feature amount classification processing unit 20 classifies the feature amount of the detected defect portion into a plurality of classes, based on the classification criterion stored in the feature amount classification DB 13. The single-class AI processing unit 30 includes a plurality of single-class AI processors (30a to 30n) each for identifying a single defect type for each of the classes to which the feature amount classified by the feature amount classification processing unit 20 belongs. For some of the classes to which the feature amount classified by the feature amount classification processing unit 20 belongs, the single-class AI processing unit 30 uses the single-class AI processing units (30a to 30n) to identify the defect type classified into the classes. The inspection assistance device 10 according to the present embodiment provides the discrimination function to the processing device 5 offline or online, based on the information regarding the abnormal portion transmitted from the output unit 58.

<Device Configuration>

Figure 2:
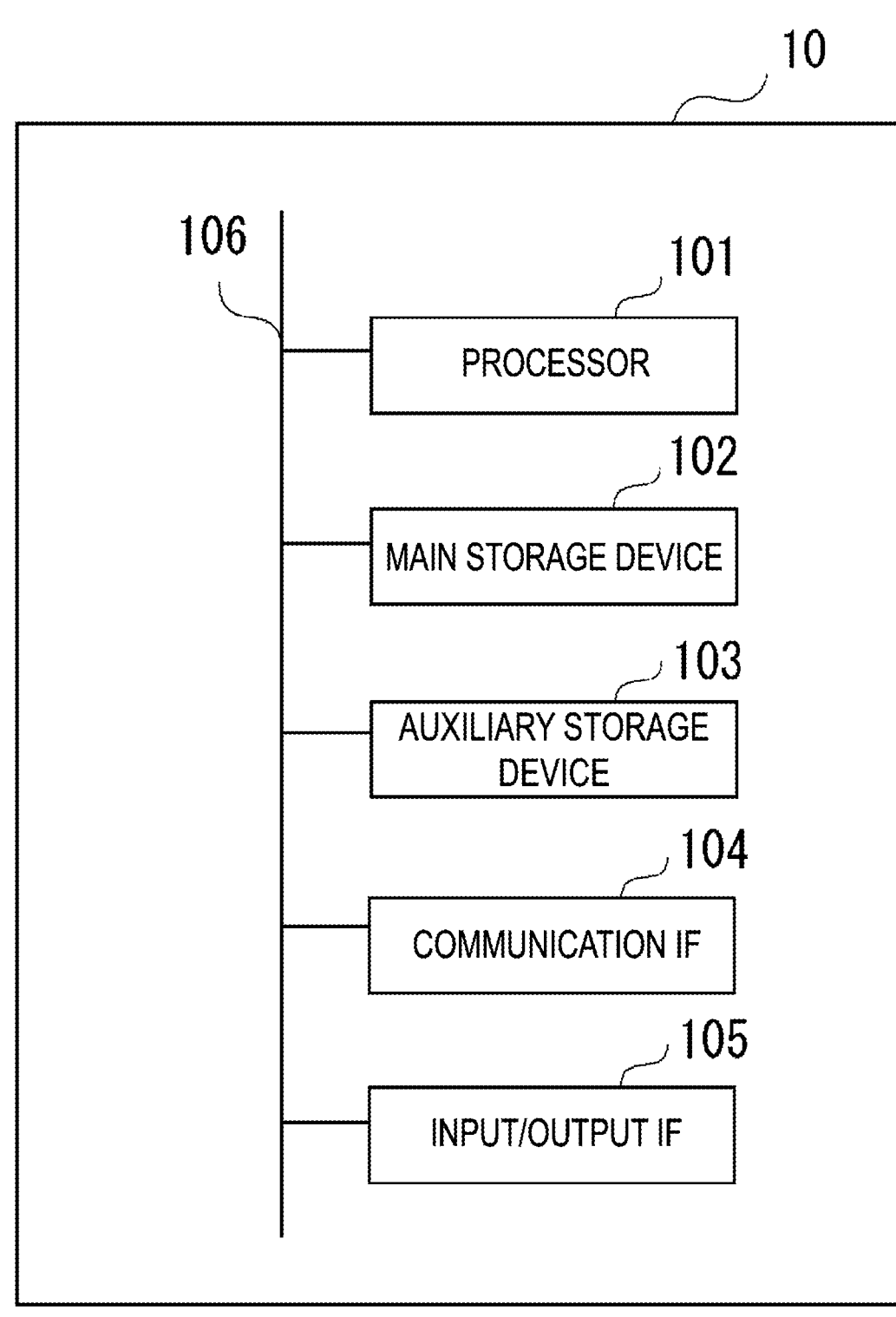
FIG. 2 is a diagram illustrating an example of a hardware configuration of an inspection assistance device according to the first embodiment of the present invention.

FIG. 2 is a diagram illustrating an example of a hardware configuration of the inspection assistance device 10 according to the present embodiment. As illustrated in FIG. 2, the inspection assistance device 10 is a computer including, as components, a processor 101, a main storage device 102, an auxiliary storage device 103, a communication IF 104, and an input/output IF 105 which are connected to each other by a connection bus 106. The main storage device 102 and the auxiliary storage device 103 are recording media readable by the inspection assistance device 10. The main storage device 102 and the auxiliary storage device 103 constitute a memory of the inspection assistance device 10. A plurality of the above-described components may be provided, or some of the components need not be provided.

The processor 101 is a central processing unit that controls the entire inspection assistance device 10. The processor 101 is, for example, a Central Processing Unit (CPU), a Digital Signal Processor (DSP), or the like. For example, the processor 101 provides functions meeting predetermined purposes by loading programs stored in the auxiliary storage device 103 into a work area of the main storage device 102 to cause the programs to be executable, and controlling peripheral equipment through execution of the programs. In the present embodiment, execution of the programs provides the functions of the feature amount classification processing unit 20, the single-class AI processing unit 30 (30a to 30n), the detection data DB 12, the feature amount classification DB 13, and the learning data DB 14. Each DB is, for example, a relational database constructed by managing data stored in the auxiliary storage device 103 and the like by a program of a database management system (DBMS) executed by the processor 101 of the inspection assistance device 10. Note that some or all of the functions may be provided by an Application Specific Integrated Circuit (ASIC), a Graphics Processing Unit (GPU), or the like. Similarly, some or all of the functions may be realized by dedicated large scale integration (LSI) such as a Field-Programmable Gate Array (FPGA), a numerical processor, a vector processor, or an image processor, or any other hardware circuit. The inspection assistance device 10 may be realized by a single physical configuration or may be realized by a configuration of a plurality of computers cooperating with each other.

The main storage device 102 stores programs executed by the processor 101, data processed by the processor, and the like. The main storage device 102 includes a flash memory, a Random Access Memory (RAM), and a Read Only Memory (ROM). The auxiliary storage device 103 stores various programs and various data in a recording medium in a readable and writable manner. The auxiliary storage device 103 is also referred to as an external storage device. The auxiliary storage device 103 stores, for example, an Operating System (OS), various programs, various tables, and the like. The OS includes, for example, a communication interface program that delivers and receives data to and from an external device connected via the communication IF 104, or the like. The external device or the like is, for example, the processing device 5 connected to the communication network N, a computer such as an information processing terminal, an external storage device, or the like.

The auxiliary storage device 103 is used as a storage area auxiliary for the main storage device 102, and stores programs executed by the processor 101, data processed by the processor 101, and the like. The auxiliary storage device 103 is a silicon disk including a nonvolatile semiconductor memory (a flash memory or an Erasable Programmable ROM (EPROM)), a solid-state drive device, a Hard Disk Drive (HDD) device, or the like. Examples of the auxiliary storage device 103 include a drive device for a removable recording medium such as a CD drive device, a DVD drive device, or a BD drive device. Examples of the removable recording medium include a CD, a DVD, a BD, a Universal Serial Bus (USB) memory, and a Secure Digital (SD) memory card.

The communication IF 104 is an interface for connecting the inspection assistance device 10 to the communication network N. The communication IF 104 can employ an appropriate configuration in accordance with a scheme for connection to the communication network N. The input/output IF 105 is an interface that inputs and outputs data from and to equipment connected to the inspection assistance device 10. The input/output IF 105 connects to, for example, a keyboard, a pointing device such as a touch panel or a mouse, and an input device such as a microphone. The inspection assistance device 10 receives, via the input/output IF 105, an operation instruction or the like from a worker who operates the input device. The input/output IF 105 also connects to, for example, a display device such as an LCD, an EL panel, or an organic EL panel, and an output device such as a printer or a speaker. The inspection assistance device 10 outputs, via the input/output IF 105, data and information to be processed by the processor 101 and data and information to be stored in the main storage device 102 and the auxiliary storage device 103.

<Processing Configuration>

First, as a comparative example, defect type discrimination processing using AI that performs multi-class classification will be described with reference to FIG. 3. As illustrated in FIG. 3, in a case where an abnormal portion is detected in a sheet product and multi-class classification AI is employed that discriminates what type of abnormality is occurring in the abnormal portion, an image is imported from an imaging device which is a camera (A1), and the position of the abnormal portion (defect portion) in the image is identified (A2). The position of the defect portion in the image can be represented, for example, as twodimensional coordinates (X, Y) from the origin at the top left corner to the bottom right corner of the image. For example, a method similar to that of the abnormality detection unit 53 described above is used to identify a portion where the degree of change in the pixel value of the image exceeds a threshold, and the image of a partial region containing this portion (a rectangular region or the like in which the portion is inscribed) is trimmed (A3). Then, AI processing for performing multi-class classification is applied to the trimmed image of the defect portion (A4).

In the multi-class classification AI, the set data of "defect image+correct-answer defect type" accumulated in the database is learned in advance for all defect types (A5). In the multi-class classification AI, defect images and correct-answer defect types learned in advance are used to automatically perform the extraction process for the feature amount for each defect type and the modeling for discriminating the defect type from the extracted feature amount (A6), and a classification result based on the modeling is output (A7). In the example of FIG. 3, six types (air bubble, hole, insect, foreign matter, wrinkle, and fiber) of discrimination results are output that indicate what type of abnormality the defect is. The use of the multi-class classification AI enables the six types of discrimination (multi-class discrimination) indicating what type of abnormality the defect occurring in the sheet product is.

However, as illustrated in circle 1, in the multi-class classification AI, set data of "defect image+correct-answer defect type" needs to be prepared for every defect type for training the AI, and thus a large amount of learning data for classification into six defect types is accumulated in the database. Note that, for a defect type which does not frequently appear, the dataset may fail to be sufficiently prepared, and learning for classification determination may be incomplete. As illustrated in circle 2, a complicated network structure needs to be constructed that includes the extraction of the feature amount for classification into six defect types from a trimmed image of a defect portion and modeling of type discrimination, and advanced tuning of parameters such as weighting among nodes connected in a network is required. In a case where no engineer having such a skill is secured, application of the multi-class classification AI may be difficult. Furthermore, every time learning is performed, the criteria for the extraction of the feature amount, modeling, and the like for reaching the defect type change. For example, when a new "defect image+correct-answer defect type" for a defect type "wrinkle" is learned, a criterion for determining another defect type is affected. Accordingly, a defect image having stably been identified as a "wrinkle" before the learning may be more frequently determined to be a "fiber" or "foreign matter", leading to unstable determination.

The inspection assistance device 10 according to the present embodiment includes a single-class AI processing unit 30 as a processing function. Each single-class AI processor constituting the single-class AI processing unit 30 is AI for discriminating an individual defect type. In each single-class AI processor, set data for identifying a single defect type is used as learning data, and a correct-answer defect type specified by the set data is learned.

FIG. 4 is a diagram illustrating discrimination processing of the single-class AI processor. FIG. 4 illustrates an example of discrimination using the single-class AI processor. Assuming that the single defect type identified by the single-class AI processor A9 is "A", the single-class AI processor learns, as learning data, set data limited to "defect image (A)+correct-answer defect type (A)" (A10). The single-class AI processor for identifying the single defect type "A" learns the process of extracting the feature amount and the modeling for determining the defect type from the extracted feature amount, based on the set data limited to "defect image (A)+correct-answer defect type (A)". Then, the single-class AI processor for identifying the single defect type "A" automatically performs the learned process of extracting the feature amount and the learned modeling for determining the defect type from the extracted feature amount, and discriminates whether the image (A8) of the defect portion is "A" or "Not A". For example, in a case where "A" is "wrinkle", the discrimination result from the single-class AI processor is classified into two values of "wrinkle" and "not classified" discriminated to be other than wrinkle. As described above, in the discrimination using the single-class AI processor according to the present embodiment, a defect type included in an image to be classified is discriminated between a defect type learned using the set data and a not-classified type when a defect type other than the defect type learned using the set data is discriminated.

In the present embodiment, a plurality of the single-class AI processors is used to discriminate a defect type of an image of a defect portion. For each single-class AI processor, as described with reference to FIG. 4, the dataset ("defect image+correct-answer defect type") for identifying a single defect type is prepared as learning data, and unlike the AI processor performing multi-class classification, the single-class AI processor need not accumulate, in the database, a large amount of set data of "defect image+correct-answer defect type" for all defect types. For example, the single-class AI processing only needs to discriminate between a single defect type and the other defect types, and thus does not require a complicated network structure to be constructed as in the multi-class AI processing, nor advanced tuning of parameters. Accordingly, the worker is not required to have a high level of skill. Furthermore, since a single defect type only needs to be identified, learning of new set data does not affect identification of another defect type, and stable discrimination results can be obtained even after relearning.

Figure 5:
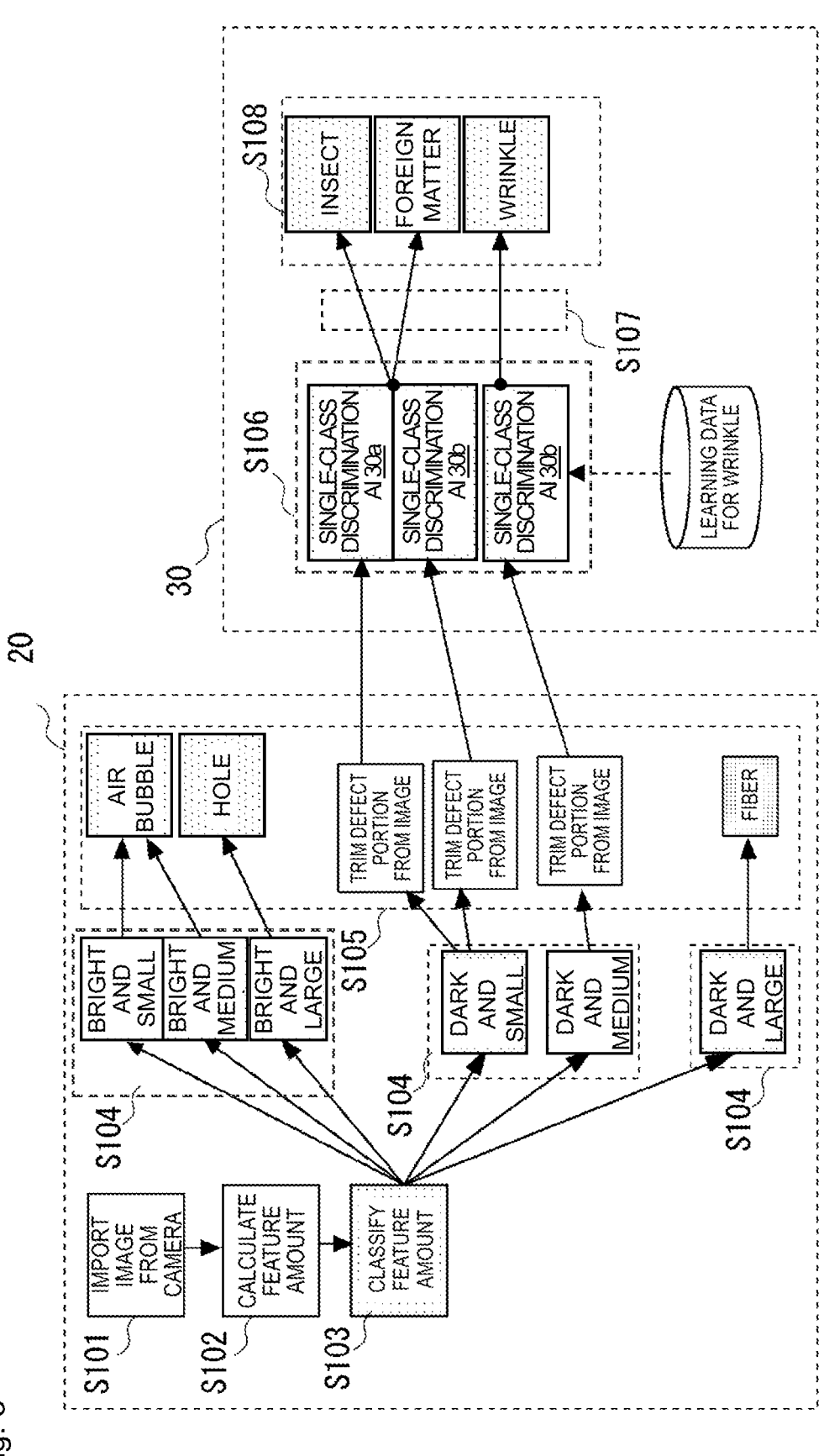
FIG. 5 is a flowchart illustrating an example of the defect type determination processing of the inspection assistance device according to the first embodiment of the present invention.

FIG. 5 is a flowchart illustrating an example of the defect type determination processing provided by the inspection assistance device 10 according to the present embodiment. In the flow of the present embodiment, as preprocessing before the discrimination of defect type by the single-class AI processing, feature amount analysis is performed on the abnormal portion occurring in the sheet product, based on the degree of change in a luminance value of the abnormal portion and the size of the abnormal portion. As a result of the feature amount analysis, the feature amount of the abnormal portion is classified into a plurality of patterns. From among the plurality of patterns classified, a pattern is selected for which the defect type is to be discriminated using the single-class AI processing. Then, in the present flow, the single-class AI discrimination processing is performed on the selected feature amount pattern and the individual defect type associated with each single-class AI discrimination is discriminated. The processing of the present flow illustrated in FIG. 5 is provided by the cooperation between the feature amount classification processing unit 20 and the single-class AI processing unit 30 including the plurality of single-class AI processors (30a to 30n).

After the processing is started, an image is imported from the imaging device 4, which is a camera (step S101), and the feature amount of the abnormal portion (defect portion) in the image is calculated (step S102). In the calculation of the feature amount, for example, the degree of change in the luminance value and the size are obtained from the image of the abnormal portion occurring in the sheet product. For example, a portion where the degree of change in the pixel value of the image exceeds the threshold is identified using a method similar to that of the abnormality detection unit 53, and the size is obtained by calculating the area of the inscribed rectangular region in which the portion is inscribed. From the calculation of the average luminance value of the inscribed rectangle, the degree of change in the luminance value of the defect portion is obtained. In step S103, the calculated feature amount is classified (feature amount classification). For example, based on the calculated average luminance value, the feature amount is classified into "bright" equal to or greater than a preset threshold and "dark" smaller than the threshold. Similarly, based on the calculated area of the inscribed rectangular region, the feature amount is classified into "large", "medium", and "small" in the relative size. As a result of the classification, the feature amount of the defect portion is classified into six patterns of "bright and small", "bright and medium", "bright and large", "dark and small", "dark and medium", and "dark and large" in terms of the combination of the average brightness value and the size (step S104). Note that the feature amount of the defect portion may be classified by using an indicator other than the average luminance value nor the size, or may be classified based on a combination of another indicator and the average luminance value and the size. For example, the feature amount may be classified using optical characteristics such as the color or polarization of the defect portion. The feature amount only needs to be classified into patterns that allow identification of a single defect type by the single-class AI to be applied.

In step S105, one or more patterns for discriminating the defect type using the single-class AI processing are selected from among the classified patterns. For example, as illustrated in FIG. 5, the patterns of "dark and small" and "dark and medium" are selected as the patterns to which the defect type by the single-class AI processing is to be applied. A criterion for such a selection can be set in advance by a user who inspects the sheet product. In the example of FIG. 5, empirical knowledge discriminates among "air bubble" corresponding to the defect type of the patterns "bright and small" and "bright and medium", "hole" corresponding to the defect type of the pattern "bright and large", and "fiber" corresponding to the defect type of the pattern "dark and large", the patterns "bright and small", "bright and medium", "bright and large", and "dark and large" each being obtained by classifying the feature amount of the defect portion. Accordingly, in step S105, the classified patterns "dark and small" and "dark and medium" are selected in order to discriminate the defect types by the single-class AI processing. For the selected patterns, when the defect portion is trimmed, the processing proceeds to step S106. Note that the processing from step S106 to step S108 is provided by the single-class AI processing unit 30.

In step S106, the defect type is discriminated using a plurality of single-class AI processing operations. For example, in a case where the defect types "insect", "foreign matter", and "wrinkle" are to be discriminated, discrimination processing is performed on images of the defect portion trimmed using the single-class AI processors 30a, 30b, and 30c for identifying the respective defect types. The single-class AI processor 30a is trained using the set data of "defect image+correct-answer defect type (insect)", and discriminates between the defect type "insect" and the defect types other than "insect" for the image of the defect portion. The single-class AI processor 30b is trained using the set data of "defect image+correct-answer defect type (foreign matter)", and discriminates between the defect type "foreign matter" and the defect types other than "foreign matter" for the image of the defect portion. The single-class AI processor 30c is trained using the set data of "defect image+correct-answer defect type (wrinkle)", and discriminates between the defect type "wrinkle" and the defect types other than "wrinkle" for the image of the defect portion. Note that, in the description below, the single-class AI processor 30a for identifying the defect type "insect" and the single-class AI processor 30b for identifying the defect type "foreign matter" are assumed to be applied to the image of the defect portion trimmed from the classification pattern for the feature amount "dark and small", and that the single-class AI processor 30c for identifying the defect type "wrinkle" is assumed to be applied to the image of the defect portion trimmed from the classification pattern for the feature amount "dark and medium".

In Step S107, discrimination results are arbitrated in a case where the discriminations by the plurality of single-class AI processors are applied to the same defect image. FIGS. 6(*a*) and 6(*b*) are diagrams illustrating the arbitration of the discrimination results in step S107. In the present flow, the single-class AI processor 30a for identifying the defect type "insect" and the single-class AI processor 30b for identifying the defect type "foreign matter" are applied to the image of the defect portion trimmed from the classification pattern for the feature amount "dark and small". The discrimination results from the respective processors for the same defect image include four combinations as illustrated in FIG. 6A. Specifically, the combinations include "insect" and "foreign matter", "insect" and "other than foreign matter", "foreign matter" and "other than insect", and "other than foreign matter" and "other than insect".

Here, in a case where the defect type is determined to be "insect" by the single-class AI processor 30a for identifying the defect type "insect" and the defect type is determined to be "other than foreign matter" by the single-class AI processor 30b for identifying the defect type "foreign matter", the defect type of the defect image can be identified as "insect". Similarly, in a case where the defect type is determined to be "other than insect" by the single-class AI processor 30a for identifying the defect type "insect" and the defect type is determined to be "foreign matter" by the single-class AI processor 30b for identifying the defect type "foreign matter", the defect type of the defect image can be identified as "foreign matter". This is because the defect type of the defect image is a defect type learned by each single-class AI processor, based on the set data provided for training the single-class AI processor.

However, in a case where the defect type is determined to be "insect" by the single-class AI processor 30a for identifying the defect type "insect" and the defect type is determined to be "foreign matter" by the single-class AI processor 30b for identifying the defect type "foreign matter", whether the defect type of the defect image is "insect" or "foreign matter" fails to be identified. Such a case may occur, for example, in a case where learning data is not sufficiently prepared. In step S107, a criterion for arbitrating such discrimination results is preset. In the present flow, in a case where the defect type is determined, by the single-class AI processor for discriminating between "A" and "other than A", to be a defect type learned by the single-class AI processor for discriminating between "A" and "other than A" and the defect type is determined, by the single-class AI processor for discriminating between "B" and "other than B", to be a defect type learned by the single-class AI processor for discriminating between "B" and "other than B", it is determined that the defect type is to be inspected through visual observation as illustrated in FIG. 6A. Such a criterion is set in advance by a user who inspects the sheet product. Note that, in a case where the defect type is determined to be "other than insect" by the single-class AI processor 30*a* for identifying the defect type "insect" and the defect type is determined to be "other than foreign matter" by the single-class AI processor 30*b* for identifying the defect type "foreign matter", the defect type is determined to be of the not classified type for which the feature amount of the defect portion is excluded from the targets for discrimination of defect type.

As illustrated in FIG. 6B, the single-class AI processor 30*c* for identifying the defect type "wrinkle" is applied to the image of the defect portion trimmed from the classification pattern for the feature amount "dark and medium", and a discrimination criterion in the AI processing trained with the learning data of wrinkle is used to discriminate between "wrinkle" and "other than wrinkle". In step S107, in a case where the defect type is determined to be "other than wrinkle" by the single-class AI processor 30*c*, the defect type is determined to be of the "not classified" type for which the feature amount of the defect portion is excluded from the targets for discrimination of defect type in accordance with the criterion set in advance by a user. As described above, by providing the arbitration function for the discrimination results, the processing workload related to the discrimination of defect type can be reduced, enabling the online processing time to be shortened.

In step S108, the defect types discriminated using the single-class AI processors 30*a*, 30*b*, and 30*c* are output. Specifically, "insect" and "foreign matter" identified from the trimmed image of the defect portion based on the classification pattern for the feature amount "dark and small", and "wrinkle" identified from the trimmed image of the defect portion based on the classification pattern for the feature amount "dark and small" are output. For example, the discrimination result may be output to the processing device 5 connected online, or may be displayed on a display panel or the like included in the inspection assistance device 10 offline. After the processing of step S108, the present routine is temporarily terminated.

As described above, as preprocessing before the discrimination of defect type by the single-class AI processing, the inspection assistance device according to the present embodiment can perform the feature amount analysis on the abnormal portion occurring in the sheet product, based on the degree of change in the luminance value of the abnormal portion and the size of the abnormal portion, allowing selecting of the feature amount pattern to which the single-class AI processing is to be applied. This can reduce in advance feature amounts related to the discrimination of defect type of an abnormal portion detected in the sheet product, allowing for a relative reduction in processing workload related to the discrimination using the single-class AI processing.

In the inspection assistance device 10 according to the present embodiment, the single-class AI processing can be used to discriminate the defect type. For the single-class AI processor, as described with reference to FIG. 4, the dataset ("defect image+correct-answer defect type") for identifying a single defect type is prepared as learning data, and unlike the AI processor performing multi-class classification, the single-class AI processor need not accumulate, in the database, a large amount of set data of "defect image+correct-answer defect type" for all defect types. For example, the single-class AI processing only needs to discriminate between a single defect type and the other defect types, and thus does not require a complicated network structure to be constructed as in the multi-class AI processing, nor advanced tuning of parameters. Accordingly, the worker is not required to have a high level of skill. Furthermore, since a single defect type only needs to be identified, learning of new set data does not affect identification of another defect type, and stable discrimination results can be obtained even after relearning.

In the inspection assistance device 10 according to the present embodiment, discrimination by a plurality of single-class AI processing operations can be applied to the same defect image. Accordingly, the discrimination results from the single-class AI processors are combined to enable enhancement of the discrimination accuracy for the defect type learned by each single-class AI. The discrimination results from the single-class AI processors are combined to enable the feature amount of the defect portion to be excluded from the targets for discrimination of defect type. As described above, by combining and arbitrating the discrimination results from the single-class AI processing, the processing workload related to the discrimination of defect type can be reduced, enabling the online processing time to be shortened. According to the present embodiment, a technique can be provided that uses the AI processing to enable stable discrimination of various defect types for a defect occurring in the sheet product.

[First Variation]

Figure 7:
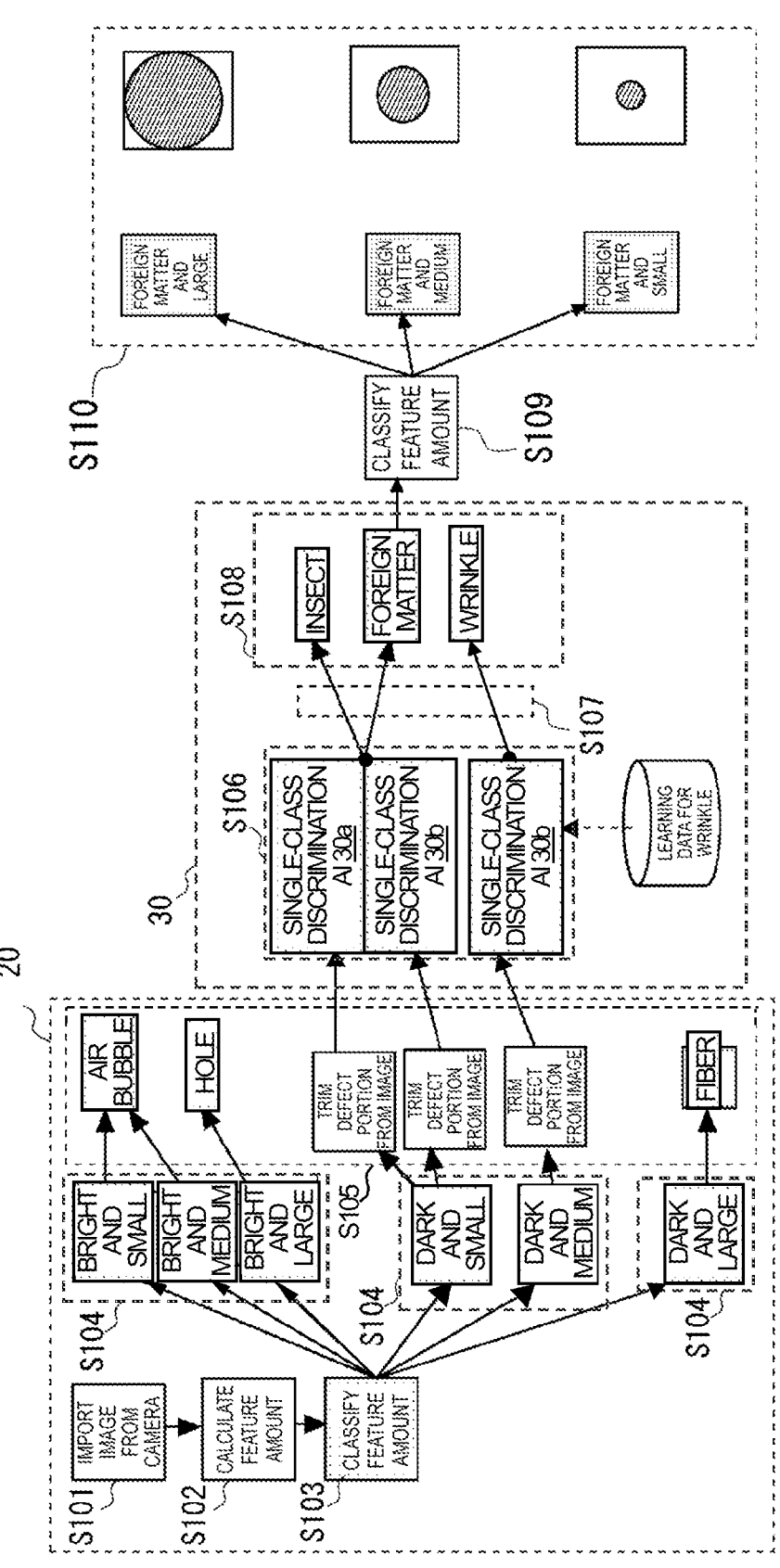
FIG. 7 is a flowchart illustrating an example of defect type determination processing of the inspection assistance device according to a first variation of the present invention.

FIG. 7 is a flowchart illustrating an example of defect type determination processing provided by the inspection assistance device 10 according to a first variation. The flow illustrated in FIG. 7 illustrates an aspect in which the feature amount classification is further applied to the defect type identified using the single-class AI processing. The processing of the present flow enables ranking for identifying the product type of the sheet product, the defect type of which has been identified by the single-class AI processing. Note that, in the flow illustrated in FIG. 7, processing from step S101 to step S108 is similar to that in the first embodiment, and thus description thereof is omitted.

In step S109, for the purpose of ranking the sheet product including the abnormal portion, the defect type of which is identified as "foreign matter", the feature amount classification is performed, and the result of the classification is output (step S110). In step S109, classification more precise than the feature amount classification in step S103 is performed on the abnormal portion the defect type of which is identified as "foreign matter". Specifically, the defect area in the image trimmed from the defect portion is calculated. Then, based on the defect area, the product including the abnormal portion, the defect type of which is determined to be "foreign matter" is classified according to a ranking index (step S110).

For example, if the defect area exceeds a first threshold (for example, 10000), the product is classified as "large foreign matter", and if the defect area is equal to or less than the first threshold and equal to or more than a second threshold (for example, 100), the product is classified as "medium foreign matter". Similarly, if the defect area is less than the second threshold, the product is classified as "small foreign matter". Such a threshold is set in advance by a user who inspects the sheet product. Note that, in step S110, an example of classification in three stages is illustrated, but two or five stages may also be used as long as the classification contributes to the ranking of a sheet product including an abnormal portion. Furthermore, although the feature amount classification is performed in step S109 as rule-based classification, AI processing may of course be used for the processing. After the processing in step S110, the present routine is temporarily terminated.

[Second Variation]

In the first embodiment and the first variation, the pattern classification (step S103) is performed on the feature amount calculated from the abnormal portion (defect portion), but the calculated feature amount may be used to determine whether the defect types can be discriminated by the AI processing and to select the single-class AI processor to be applied to the discrimination of defect types. Processing in the second variation allows the discrimination processing for the defect type to be optimized.

Figure 8:
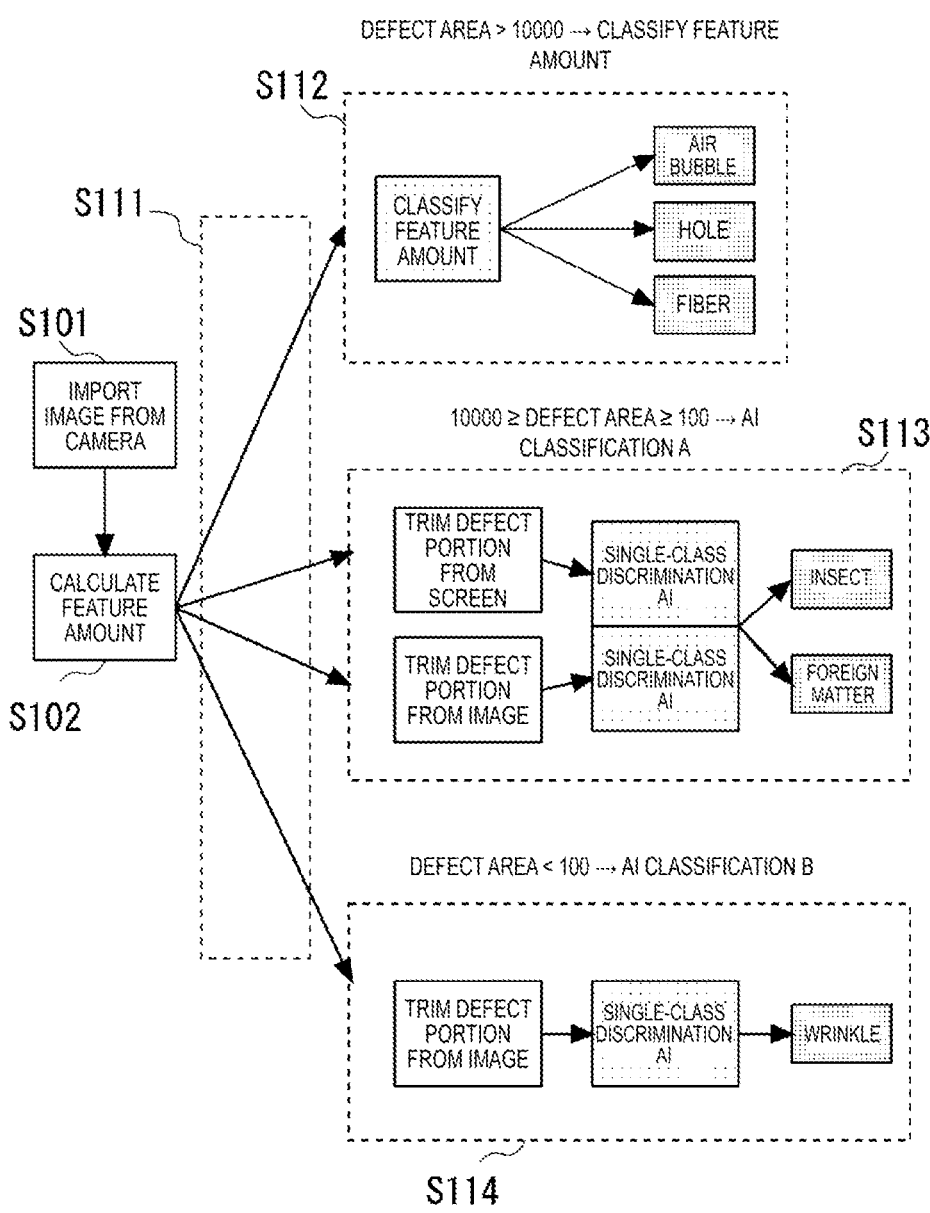
FIG. 8 is a flowchart illustrating an example of defect type determination processing of the inspection assistance device according to a second variation of the present invention.

FIG. 8 is a flowchart illustrating an example of defect type determination processing provided by the inspection assistance device 10 according to the second variation. In the flow of FIG. 8, processing from step S101 to step S102 is similar to that in the first embodiment, and thus description thereof is omitted. In step S111, according to the calculated feature amount, whether to apply the AI processing to the discrimination of defect type is determined, and in a case where the AI processing is to be applied to the discrimination of defect type, which single-class AI processor is to be used is selected. Specifically, the above-described determination and selection of the single-class AI processor are performed based on the defect area, which is the calculated feature amount and corresponds to the density average value of the abnormal portion.

In step S111, for example, in a case where the defect area exceeds the first threshold, the AI processing is determined not to be applied to the discrimination of defect type, and the processing proceeds to step S112. In a case where the defect area is equal to or less than the first threshold and is equal to or more than the second threshold, the AI processing is determined to be applied to the discrimination of defect type, and the single-class AI processor 30a for discriminating the defect type "insect" and the single-class AI processor 30b for discriminating the defect type "foreign matter" are selected. The processing then proceeds to step S113. Similarly, in a case where the defect area is less than the second threshold, the AI processing is determined to be applied to the discrimination of defect type, and the single-class AI processor 30c for discriminating the defect type "wrinkle" is selected. The processing then proceeds to step S114. Here, the first threshold and the second threshold are similar to those in the first variation.

With the processing in step S111, the processing workload related to the discrimination of defect type can be reduced, allowing the discrimination processing for the defect type to be optimized.

Note that, in step S112, feature amount classification processing similar to the processing in steps S103 and S104 in the first embodiment is performed to identify each of the defect types "air bubble", "hole", and "fiber". In step S113, the processing from step S105 to step S108 in the first embodiment is performed by the single-class AI processor 30a for discriminating the defect type "insect" and the single-class AI processor 30b for discriminating the defect type "foreign matter", and the defect types "insect" and "foreign matter" are discriminated. Similarly, in step S114, the single-class AI processor 30c for discriminating the defect type "wrinkle" performs the processing from step S105 to step S108 of the first embodiment, and the defect type "wrinkle" is discriminated. After the processing in step S114, the present routine is temporarily terminated.

As described above, the second variation also uses the feature amount calculated from the abnormal portion occurring in the sheet product, to enable a relative reduction in processing workload related to the discrimination using the single-class AI processing.

(Others)

The above-described embodiments are merely examples, and the disclosure of the present embodiments can be implemented through appropriate variation without departing from the gist of the disclosure. The processing operations and means described in the present disclosure can be implemented in free combination as long as no technical contradiction arises.

The processing described as being performed by one device may be shared and performed by a plurality of devices. Alternatively, the processing described as being performed by different devices may be performed by one device. In a computer system, what kind of hardware configuration is used to implement each function can be flexibly changed. For example, as indicated by a rectangular frame 90 of thin dash lines, the processing device 5 according to the first embodiment may include the configuration of the inspection assistance device 10. The processing device 5 may include the feature amount classification processing unit 20, the single-class AI processing unit 30, the feature amount classification DB 13, and the learning data DB 14, and may perform the functions of the inspection assistance device 10 in the present embodiment.

<Computer-Readable Recording Medium>

A program for causing an information processing device or any other machine or device (hereinafter referred to as a computer or the like) to implement any of the functions described above may be recorded in a recording medium readable by the computer or the like. The functions can be provided by causing the computer or the like to load the program from the recording medium and to execute the program.

Here, the recording medium readable by the computer or the like refers to a recording medium capable of storing information such as data or programs by an electrical, magnetic, optical, mechanical, or chemical action in such a manner that the computer or the like can read the information from the recording medium. Among such recording media, those which can be removed from the computer or the like include, for example, flexible disks, magneto-optical discs, CD-ROMs, CD-R/Ws, DVDs, Blu-ray discs, DATs, 8-mm tapes, and memory cards such as flash memories. Recording media fixed to the computer or the like include hard disks, ROMs, and the like.

Note that, in order to allow the constituent features of the present invention to be compared with the configurations of the examples, the constituent features of the present invention will be described below with reference numerals in the drawings.

<Supplementary Note 1>

An assistance device (10) for assisting a determination inspection for detecting, from a captured image of an object to be inspected (2), an abnormality occurring in the object to be inspected (2) and determining a type of the abnormality detected, the assistance device (10) including:

a classification processing unit (20) configured to calculate, from the captured image, a feature amount of the abnormality occurring in the object to be inspected (2), to classify the feature amount calculated into a plurality of classes, and to select, from the plurality of classes, one or more classes to be processed for each of which an abnormality type is to be discriminated using a learning discrimination unit (30); and the learning discrimination unit (30) including a learning discriminator (30a to 30n) for each abnormality type, the learning discriminator (30a to 30n) having learned, by using set data obtained by combining an element image causing the abnormality and an abnormality type corresponding to the element image as a correct answer, a discrimination criterion for discriminating whether the abnormality to be discriminated is of the abnormality type corresponding to the correct answer or other than the abnormality type corresponding to the correct answer, wherein the learning discrimination unit (30) discriminates the abnormality type for each of the one or more classes to be processed selected by the classification processing unit (20), based on an individual discrimination result from the learning discriminator (30a to 30n) having learned the discrimination criterion for each abnormality type.

REFERENCE NUMERALS

1 Inspection assistance system, 2 Object to be inspected (sheet, sheet product), 3a Visible light source, 3b Visible light source for transmitted light, 4 Imaging device, 5 Processing device, 10 Inspection assistance device, 11 Control unit, 12 Detection data DB, 13 Feature amount classification DB 14 Learning data DB, 20 Feature amount classification processing unit, 30 Single-class AI processing unit, 30a to 30n Single-class AI processor, 101 Processor, 102 Main storage device, 13 Auxiliary storage device, 14 Communication IF, 15 Input/output IF, 106 Connection bus

The invention claimed is:

1. An assistance device for assisting a determination inspection for detecting, from a captured image of an object to be inspected, an abnormality occurring in the object to be inspected and determining a type of the detected abnormality, the assistance device comprising:

a classification processing unit; and a learning discrimination unit, wherein the classification processing unit is configured to:

calculate, from the captured image, a feature amount of the abnormality occurring in the object to be inspected:

classify the calculated feature amount into a plurality of classes; and select, from the plurality of classes, one or more classes to be processed, for each of which an abnormality type is to be discriminated using the learning discrimination unit, wherein the learning discrimination unit includes a learning discriminator for each abnormality type, the learning discriminator being trained with a discrimination criterion by using set data obtained by combining an element image causing the abnormality and an abnormality type corresponding to the element image as a correct answer, the discrimination criterion being for discriminating whether an abnormality to be discriminated is of the abnormality type being a correct answer or of an abnormality type other than the abnormality type being a correct answer, wherein the learning discrimination unit discriminates an abnormality type for each of the one or more classes to be processed, selected by the classification processing unit, based on an individual discrimination result from the learning discriminator trained with the discrimination criterion for each abnormality type, and wherein the learning discriminator includes a first learning discriminator trained with a first discrimination criterion for discriminating a first abnormality and a second learning discriminator trained with a second discrimination criterion for discriminating a second abnormality, and when, for one class of the plurality of classes to be processed, a discrimination result from the first learning discriminator identifies the first abnormality and a discrimination result from the second learning discriminator identifies an abnormality type other than the second abnormality, the abnormality type for the one class is determined to be the first abnormality.

2. The assistance device according to claim 1, wherein when, for one class of the plurality of classes to be processed, a discrimination result from the first learning discriminator identifies an abnormality type other than the first abnormality and a discrimination result from the second learning discriminator identifies the second abnormality, the abnormality type for the one class is determined to be the second abnormality.

3. The assistance device according to claim 1, wherein when, for one class of the plurality of classes to be processed, a discrimination result from the first learning discriminator identifies the first abnormality and a discrimination result from the second learning discriminator identifies the second abnormality, or a discrimination result from the first learning discriminator identifies an abnormality type other than the first abnormality and a discrimination result from the second learning discriminator identifies an abnormality type other than the second abnormality, discrimination of an abnormality type for the one class is handed over to specified processing.

4. The assistance device according to claim 1, wherein the classification processing unit further classifies into a plurality of subclasses a feature amount of a class, for which the abnormality type has been determined.

5. A method performed by a computer of an assistance device that assists a determination inspection for detecting, from a captured image of an object to be inspected, an abnormality occurring in the object to be inspected and determining a type of the detected abnormality, the method comprising:

calculating, from the captured image, a feature amount of the abnormality occurring in the object to be inspected:

classifying the calculated feature amount into a plurality of classes;

selecting a predetermined class from among the plurality of classes;

learning, for each type of the abnormality, a discrimination criterion by using set data obtained by combining an element image causing the abnormality and an abnormality type corresponding to the element image as a correct answer, the discrimination criterion being for discriminating whether an abnormality to be discriminated is of the abnormality type being a correct answer or of an abnormality type other than the abnormality type being a correct answer; and discriminating an abnormality type for the predetermined class, based on an individual discrimination result obtained by discrimination using the discrimination criterion learned for each type of the abnormality, wherein learning the discrimination criterion includes learning a first discrimination criterion for discriminating a first abnormality and a second discrimination criterion for discriminating a second abnormality, and when, for one class of the plurality of classes to be processed, a discrimination result from the first discrimination criterion identifies the first abnormality and a discrimination result from the second discrimination criterion identifies an abnormality type other than the second abnormality, the abnormality type for the one class is determined to be the first abnormality.

\* \* \* \* \*